US009263764B2

(12) United States Patent
Roh et al.

(10) Patent No.: US 9,263,764 B2
(45) Date of Patent: Feb. 16, 2016

(54) ELECTROLYTE FOR LITHIUM ION BATTERY, AND LITHIUM ION BATTERY INCLUDING SAME

(75) Inventors: Sae-Weon Roh, Yongin-si (KR); Man-Seok Han, Yongin-si (KR); Sung-Soo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1180 days.

(21) Appl. No.: 13/199,665

(22) Filed: Sep. 6, 2011

(65) Prior Publication Data

US 2012/0107697 A1 May 3, 2012

(30) Foreign Application Priority Data

Nov. 3, 2010 (KR) ........................ 10-2010-0108661

(51) Int. Cl.
*H01M 10/0567* (2010.01)
*H01M 10/42* (2006.01)
*H01M 10/0525* (2010.01)
*H01M 10/0569* (2010.01)

(52) U.S. Cl.
CPC ...... *H01M 10/0567* (2013.01); *H01M 10/0525* (2013.01); *H01M 10/0569* (2013.01); *H01M 10/4235* (2013.01); *H01M 2300/0025* (2013.01); *H01M 2300/0028* (2013.01); *Y02E 60/122* (2013.01)

(58) Field of Classification Search
CPC ..................... H01M 10/0567; H01M 10/0569; H01M 10/0525; H01M 10/4235; H01M 6/168; H01M 6/164; H01M 2300/0025; H01M 2300/0028; Y02E 60/122
See application file for complete search history.

(56) References Cited

U.S. PATENT DOCUMENTS

| 6,841,304 | B2 | 1/2005 | Michot et al. | |
|---|---|---|---|---|
| 7,854,854 | B2 | 12/2010 | Nishida et al. | |
| 8,273,263 | B2 | 9/2012 | Kubo et al. | |
| 2002/0110739 | A1 | 8/2002 | McEwen et al. | |
| 2005/0158623 | A1 | 7/2005 | Matsui et al. | |
| 2006/0210873 | A1* | 9/2006 | Hollenkamp et al. | 429/200 |
| 2007/0281209 | A1 | 12/2007 | Kishi et al. | |
| 2008/0083626 | A1 | 4/2008 | Kubo et al. | |
| 2008/0138704 | A1 | 6/2008 | Mizuta et al. | |
| 2010/0006794 | A1 | 1/2010 | Hawkins et al. | |
| 2010/0209782 | A1 | 8/2010 | Choi et al. | |
| 2011/0045359 | A1 | 2/2011 | Schmidt et al. | |
| 2011/0123869 | A1 | 5/2011 | Choi et al. | |

FOREIGN PATENT DOCUMENTS

| CN | 1759497 A | 4/2006 |
|---|---|---|
| CN | 101847750 A | 9/2010 |
| EP | 2 224 532 A1 | 9/2010 |
| JP | 10-247519 | 9/1998 |
| JP | 2005-229103 A | 8/2005 |
| JP | 2005-322417 A | 11/2005 |
| JP | 2005-353568 | 12/2005 |
| JP | 2006-173014 | 6/2006 |
| JP | 2006-196390 | 7/2006 |
| JP | 2006-216524 | 8/2006 |
| JP | 2007-305551 A | 11/2007 |
| JP | 2007-323837 | 12/2007 |
| JP | 2008-034192 | 2/2008 |
| JP | 2008-034193 | 2/2008 |
| JP | 2009-107990 | 5/2009 |
| JP | 2010-192430 | 9/2010 |
| KR | 10-2010-0094330 | 8/2010 |
| KR | 10-2012-0080154 | 7/2012 |
| WO | WO 99/28292 | 6/1999 |
| WO | WO 01/93363 A2 | 12/2001 |
| WO | WO 2004/082059 A1 | 9/2004 |
| WO | WO 2006/017898 A1 | 2/2006 |
| WO | WO 2006/077895 A1 | 7/2006 |
| WO | WO 2006/078866 A2 | 7/2006 |
| WO | WO 2009/132740 A2 | 11/2009 |

OTHER PUBLICATIONS

European Search Report daed Mar. 6, 2012, for corresponding European Patent application 11185688.6, 10 pages.
KIPO Notice of Allowance dated Oct. 23, 2012, for Korean priority Patent application 10-2010-0108661, (5 pages).
SIPO Office action dated Nov. 26, 2014, with English translation, for corresponding Chinese Patent application 201110328685.9, (28 pages).
Machine English Translation of JP 2005-322417 A.
Machine English Translation of JP 2007-305551 A.
EPO Office action dated May 15, 2015, for corresponding European Patent application 11185688.6, (7 pages).
JPO Office action dated Jul. 28, 2015, for corresponding Japanese Patent application 2011-229171, (5 pages).
SIPO Office action dated Jul. 1, 2015, with English translation, for corresponding Chinese Patent application 201110328685.9, (24 pages).
English machine translation of Japanese Publication 10-247519 dated Sep. 14, 1998, (10 pages).
English machine translation of Japanese Publication 2006-196390 dated Jul. 27, 2006, (10 pages).
English machine translation of Japanese Publication 2009-107990 dated May 21, 2009, (24 pages).

\* cited by examiner

*Primary Examiner* — Laura Weiner

(74) *Attorney, Agent, or Firm* — Christie, Parker & Hale, LLP

(57) ABSTRACT

An electrolyte for a lithium ion battery includes a non-aqueous organic solvent and a lithium salt. The non-aqueous organic solvent includes a flame-retardant solvent and a carbonate-based solvent. The flame-retardant solvent includes an ionic liquid including a fluorinated cation and a phosphorus-based solvent.

8 Claims, 3 Drawing Sheets

ELECTROLYTE FOR LITHIUM ION BATTERY, AND LITHIUM ION BATTERY INCLUDING SAME

CROSS-REFERENCE TO RELATED APPLICATION

This application claims priority to and the benefit of Korean Patent Application No. 10-2010-0108661 filed in the Korean Intellectual Property Office on Nov. 3, 2010, the entire contents of which are incorporated herein by reference.

BACKGROUND

1. Field

Provided is an electrolyte for a lithium ion battery and a lithium ion battery including the same.

2. Description of Related Art

Lithium rechargeable batteries have recently drawn attention as power sources for small, portable electronic devices. They use organic electrolyte solutions and therefore have twice the discharge voltage of conventional batteries using alkali aqueous solutions, and accordingly have high energy densities.

Lithium ion batteries are classified into lithium ion batteries, lithium ion polymer batteries, and lithium polymer batteries depending on the separator and the electrolyte. Their shape may be cylindrical, prismatic, coin-type, or the like.

The lithium ion battery may include a lithium salt and an organic solvent as an electrolyte solution. The organic solvent may be a 2 to 5 component-based solvent including a cyclic carbonate such as ethylene carbonate, propylene carbonate, and the like, and a linear carbonate such as dimethyl carbonate, ethylmethyl carbonate, diethyl carbonate, and the like. However, carbonate-based organic solvents have safety problems.

SUMMARY OF THE INVENTION

Some embodiments of the present invention provide an electrolyte for a lithium ion battery that is capable of improving battery characteristics as well as improving battery safety.

In some embodiments, a lithium ion battery includes the electrolyte.

According to still other embodiments of the present invention, an electrolyte for a lithium ion battery includes a non-aqueous organic solvent and a lithium salt. The non-aqueous organic solvent includes a flame-retardant solvent and a carbonate-based solvent. The flame-retardant solvent includes an ionic liquid including a fluorinated cation and a phosphorus-based solvent.

The ionic liquid including a fluorinated cation may include a cation represented by the following Chemical Formulae 1 to 8.

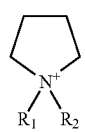

Chemical Formula 1

In Chemical Formula 1, $R_1$ may be a fluorine-substituted C1 to C5 alkyl group or an unsubstituted C1 to C5 alkyl group. $R_2$ may be a C1 to C5 alkyl group in which at least one hydrogen is substituted with fluorine.

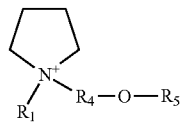

Chemical Formula 2

In Chemical Formula 2, each of $R_3$ and $R_5$ may be independently selected from fluorine-substituted C1 to C5 alkyl groups and unsubstituted C1 to C5 alkyl groups. $R_4$ may be a fluorine-substituted C1 to C5 alkylene group or an unsubstituted C1 to C5 alkylene group. At least one of $R_4$ or $R_5$ includes a group in which at least one hydrogen is substituted with fluorine.

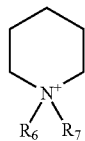

Chemical Formula 3

In Chemical Formula 3, $R_6$ may be a fluorine-substituted C1 to C5 alkyl group or an unsubstituted C1 to C5 alkyl group. $R_7$ may be a C1 to C5 alkyl group in which at least one hydrogen is substituted with fluorine.

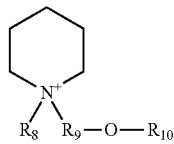

Chemical Formula 4

In Chemical Formula 4, each of $R_8$ and $R_{10}$ may be independently selected from fluorine-substituted C1 to C5 alkyl groups and unsubstituted C1 to C5 alkyl groups. $R_9$ may be a fluorine-substituted C1 to C5 alkylene group or an unsubstituted C1 to C5 alkylene group. At least one of $R_9$ or $R_{10}$ includes a group in which at least one hydrogen is substituted with fluorine.

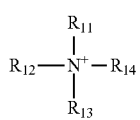

Chemical Formula 5

In Chemical Formula 5, each of $R_{11}$ to $R_{13}$ may be independently selected from fluorine-substituted C1 to C5 alkyl groups and unsubstituted C1 to C5 alkyl groups. $R_{14}$ may be a C1 to C5 alkyl group in which at least one hydrogen is substituted with fluorine.

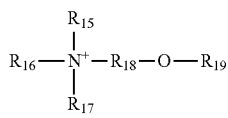

Chemical Formula 6

In Chemical Formula 6, each of $R_{15}$ to $R_{17}$ and $R_{19}$ may be independently selected from fluorine-substituted C1 to C5 alkyl groups and unsubstituted C1 to C5 alkyl groups. $R_{18}$ may be a fluorine-substituted C1 to C5 alkylene group or an unsubstituted C1 to C5 alkylene group. At least one of $R_{18}$ or $R_{19}$ includes a group in which at least one hydrogen is substituted with fluorine.

Chemical Formula 7

In Chemical Formula 7, $R_{20}$ may be a fluorine-substituted C1 to C5 alkyl group or an unsubstituted C1 to C5 alkyl group. $R_{21}$ may be a C1 to C5 alkyl group in which at least one hydrogen is substituted with fluorine.

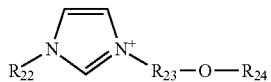

Chemical Formula 8

In Chemical Formula 8, each of $R_{22}$ and $R_{24}$ may be independently selected from fluorine-substituted C1 to C5 alkyl groups and unsubstituted C1 to C5 alkyl groups. $R_{23}$ may be a fluorine-substituted C1 to C5 alkylene group or an unsubstituted C1 to C5 alkylene group. At least one of $R_{22}$ or $R_{24}$ includes a group in which at least one hydrogen is substituted with fluorine.

The ionic liquid including the fluorinated cation may also include an anion represented by one of the following Chemical Formulae 9 to 14.

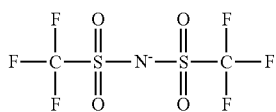

Chemical Formula 9

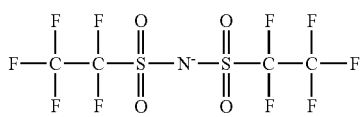

Chemical Formula 10

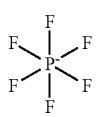

Chemical Formula 11

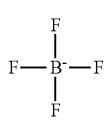

Chemical Formula 12

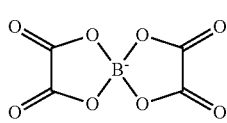

Chemical Formula 13

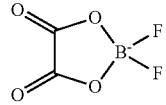

Chemical Formula 14

The phosphorus-based solvent may include a phosphate-based compound or a phosphazene-based compound. Nonlimiting examples of suitable phosphate-based compounds include trimethylphosphate (TMP), triethyl phosphate (TEP), tripropylphosphate (TPP), tricresyl phosphate (TCP), trixylenyl phosphate (TXP), and combinations thereof. Nonlimiting examples of suitable phosphazene-based compounds include hexamethoxycyclotriphosphazene, fluorinated cyclotriphosphazene, and combinations thereof.

At least one hydrogen atom of the phosphorus-based solvent may be substituted with at least one fluorine atom.

The carbonate-based solvent may include at least one of a linear carbonate-based solvent or a fluorinated cyclic carbonate-based solvent. Nonlimiting examples of suitable linear carbonate-based solvents include dimethyl carbonate (DMC), diethyl carbonate (DEC), dipropyl carbonate (DPC), methylethyl carbonate (MEC), methylpropyl carbonate (MPC), ethylpropyl carbonate (EPC), and combinations thereof.

Nonlimiting examples of suitable fluorinated cyclic carbonate-based solvents include compounds represented by the following Chemical Formula 15.

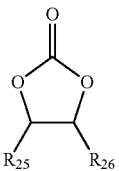

Chemical Formula 15

In Chemical Formula 15, each of $R_{25}$ and $R_{26}$ may be independently selected from hydrogen, halogens, cyano groups (CN), nitro groups ($NO_2$), and C1 to C5 fluoroalkyl groups, provided that at least one of $R_{25}$ and $R_{26}$ is a C1 to C5 fluoroalkyl group.

The non-aqueous organic solvent may include the flame-retardant solvent in an amount of about 20 volume % to about 50 volume %, and may include the carbonate-based solvent in an amount of about 50 volume % to about 80 volume %. In some embodiments, for example, the non-aqueous organic solvent may include about 20 volume % to about 50 volume % of the flame-retardant solvent, about 40 volume % to about 75 volume % of the linear carbonate-based solvent, and about 5 volume % to about 10 volume % of the fluorinated cyclic carbonate-based solvent.

According to another embodiment of the present invention, a lithium ion battery includes the electrolyte for a lithium ion battery, a positive electrode including a positive active material that reversibly intercalates/deintercalates lithium ions, and a negative electrode including a negative active material that reversibly intercalates/deintercalates lithium ions.

Since the electrolyte for a lithium ion battery according to embodiments of the present invention has low volatility, viscosity and self-extinguishment, a lithium ion battery including the electrolyte has good flame retardancy, good high temperature storage characteristics, good high rate charge and discharge characteristics, and good cycle-life characteristics.

DETAILED DESCRIPTION OF THE EMBODIMENTS

Figure 1:
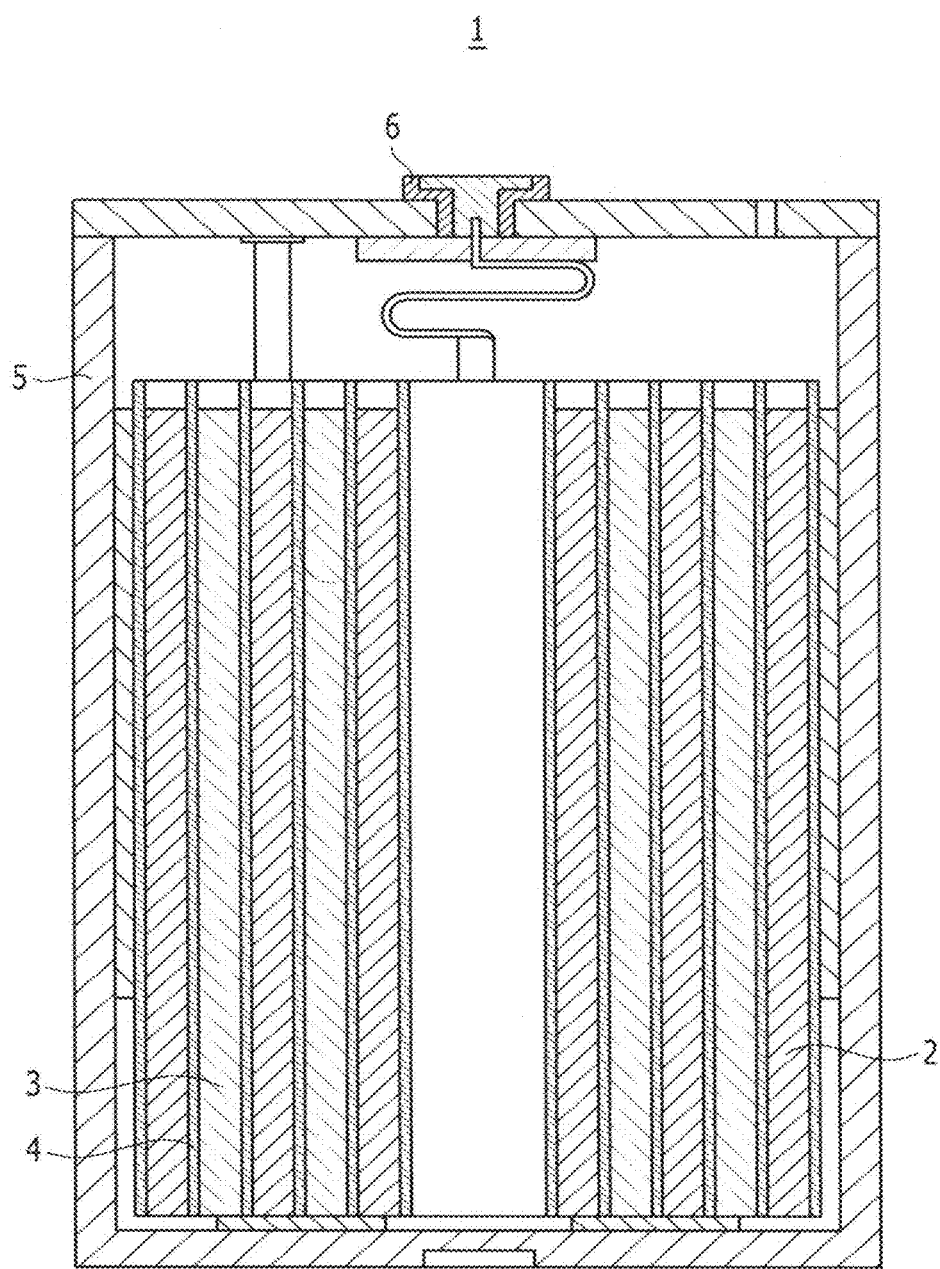
FIG. 1 is a cross-sectional view of a rechargeable lithium battery according to an embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

According to embodiments of the present invention, an electrolyte for a lithium ion battery includes a non-aqueous organic solvent and a lithium salt. The non-aqueous organic solvent includes a flame-retardant solvent and a carbonate-based solvent. The flame-retardant solvent includes an ionic liquid including a fluorinated cation and a phosphorus-based solvent.

The non-aqueous organic solvent serves as a medium for transmitting ions taking part in the electrochemical reaction of the battery.

The ionic liquid including the fluorinated cation (which is included in the non-aqueous organic solvent) may include a cation represented by one of the following Chemical Formulae 1 to 8.

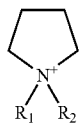

Chemical Formula 1

In Chemical Formula 1, $R_1$ may be a fluorine-substituted C1 to C5 alkyl group or an unsubstituted C1 to C5 alkyl group. $R_2$ may be a C1 to C5 alkyl group in which at least one hydrogen is substituted with fluorine.

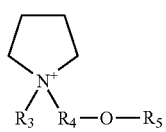

Chemical Formula 2

In Chemical Formula 2, each of $R_3$ and $R_5$ is independently selected from fluorine-substituted C1 to C5 alkyl groups and unsubstituted C1 to C5 alkyl groups. $R_4$ may be a fluorine-substituted C1 to C5 alkylene group or an unsubstituted C1 to C5 alkylene group. At least one of $R_4$ or $R_5$ includes a group in which at least one hydrogen is substituted with fluorine.

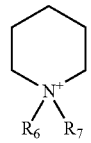

Chemical Formula 3

In Chemical Formula 3, $R_6$ may be a fluorine-substituted C1 to C5 alkyl group or an unsubstituted C1 to C5 alkyl group. $R_7$ may be a C1 to C5 alkyl group in which at least one hydrogen is substituted with fluorine.

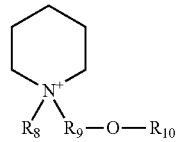

Chemical Formula 4

In Chemical Formula 4, each of $R_8$ and $R_{10}$ may be independently selected from fluorine-substituted C1 to C5 alkyl groups and unsubstituted C1 to C5 alkyl groups. $R_9$ may be a fluorine-substituted C1 to C5 alkylene group or an unsubstituted C1 to C5 alkylene group. At least one of $R_9$ or $R_{10}$ includes a group in which at least one hydrogen is substituted with fluorine.

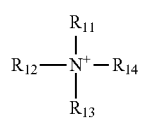

Chemical Formula 5

In Chemical Formula 5, each of $R_{11}$ to $R_{13}$ may be independently selected from fluorine-substituted C1 to C5 alkyl groups and unsubstituted C1 to C5 alkyl groups. $R_{14}$ may be a C1 to C5 alkyl group in which at least one hydrogen is substituted with fluorine.

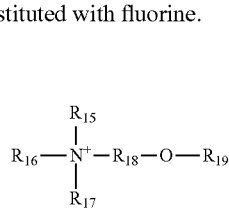

Chemical Formula 6

In Chemical Formula 6, each of $R_{15}$ to $R_{17}$ and $R_{19}$ may be independently selected from fluorine-substituted C1 to C5 alkyl groups and unsubstituted C1 to C5 alkyl groups. $R_{18}$ may be a fluorine-substituted C1 to C5 alkylene group or an unsubstituted C1 to C5 alkylene group. At least one of $R_{18}$ or $R_{19}$ includes a group in which at least one hydrogen is substituted with fluorine.

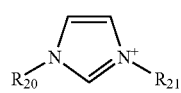

Chemical Formula 7

In Chemical Formula 7, $R_{20}$ may be a fluorine-substituted C1 to C5 alkyl groups or an unsubstituted C1 to C5 alkyl group.

$R_{21}$ may be a C1 to C5 alkyl group in which at least one hydrogen is substituted with fluorine.

Chemical Formula 8

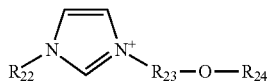

In Chemical Formula 8, each of $R_{22}$ and $R_{24}$ may be independently selected from fluorine-substituted C1 to C5 alkyl groups and unsubstituted C1 to C5 alkyl groups. $R_{23}$ may be a fluorine-substituted C1 to C5 alkylene group or an unsubstituted C1 to C5 alkylene group. At least one of $R_{22}$ or $R_{24}$ includes a group in which at least one hydrogen is substituted with fluorine.

The ionic liquid including the fluorinated cation may also include an anion represented by one of the following Chemical Formulae 9 to 14.

Chemical Formula 9

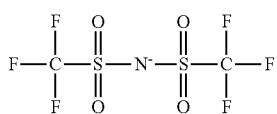

Chemical Formula 10

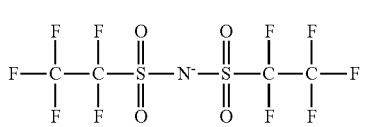

Chemical Formula 11

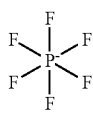

Chemical Formula 12

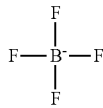

Chemical Formula 13

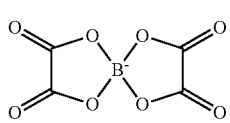

Chemical Formula 14

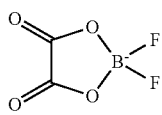

The ionic fluid in the non-aqueous organic solvent may include a combination of cations represented by Chemical Formulae 1 to 8 and anions represented by Chemical Formulae 9 to 14.

The ionic liquid including the fluorinated cation has good flame retardant properties, low volatility and viscosity, and good thermal stability. Thus, the ionic liquid imparts good flame retardancy to the resulting lithium ion battery. In addition, the ionic liquid including the fluorinated cation suppresses internal pressure increases and swelling due to gas generated from a volatilized solvent. Thus, the ionic liquid improves high temperature storage characteristics. In addition, the ionic liquid has improved reduction resistance, thereby improving battery performance characteristics.

The phosphorus-based solvent may include a phosphate-based compound or a phosphazene-based compound. Non-limiting examples of suitable phosphate-based compounds include trimethylphosphate (TMP), triethyl phosphate (TEP), tripropylphosphate (TPP), tricresyl phosphate (TCP), trixylenyl phosphate (TXP), and combinations thereof. Non-limiting examples of suitable phosphazene-based compounds include hexamethoxycyclotriphosphazene, fluorinated cyclotriphosphazene, and combinations thereof.

The phosphorus-based solvent has low viscosity and a high dielectric constant, and is a self-extinguishable material that selectively reacts with an active radical (such as R., H., and the like). Thus, the phosphorus-based solvent substantially prevents a combustion reaction. Accordingly, the phosphorus-based solvent may minimize the initial heat of decomposition and thus substantially prevent the thermal runaway phenomenon of the lithium ion battery.

At least one hydrogen in the phosphate-based compound or phosphazene-based compound may be substituted with fluorine. When the phosphate-based compound or phosphazene-based compound includes fluorine (in place of hydrogen), the electrolyte viscosity may be decreased, thus simultaneously improving impregnating properties and flame retardancy.

The flame-retardant solvent may be included in an amount of about 1 volume % to about 80 volume % based on the entire volume of the non-aqueous organic solvent. In some embodiments, for example, the flame-retardant solvent may be included in an amount of about 20 volume % to about 50 volume %. When the flame-retardant solvent is included in amounts within these ranges, the electrolyte has improved flame retardancy and impregnating properties, thereby improving the cycle-life characteristics and capacity of the resulting battery.

In addition, the ionic liquid including the fluorinated cation and the phosphorus-based solvent may be included in the flame-retardant solvent in a volume ratio ranging from about 50:50 to about 30:70. When these components are used in amounts within this range, the electrolyte has improved flame retardancy and the resulting battery has improved cycle-life characteristics and capacity.

The carbonate-based solvent may include at least one of a linear carbonate-based solvent or a fluorinated cyclic carbonate-based solvent. The carbonate-based solvent may be included in an amount of about 20 volume % to about 99 volume % based on the entire volume of the non-aqueous organic solvent. In some embodiments, for example, the carbonate-based solvent may be included in an amount of about 50 volume % to about 80 volume %. Nonlimiting examples of the linear carbonate-based solvent include dimethyl carbonate (DMC), diethyl carbonate (DEC), dipropyl carbonate (DPC), methylethyl carbonate (MEC), methylpropyl carbonate (MPC), ethylpropyl carbonate (EPC) and combinations thereof.

The linear carbonate has low viscosity and may decrease the internal resistance of the battery, thereby improving high rate and room temperature cycle-life characteristics.

The linear carbonate-based solvent may be included in an amount of about 0 volume % to about 98 volume % based on the entire amount of the non-aqueous organic solvent. In some embodiment, the linear carbonate-based solvent may be included in an amount of about 40 volume % to 75 volume %. When the linear carbonate-based solvent is included in an amount within this range, the electrolyte may have improved substrate impregnating properties and thus improved battery performance.

The fluorinated cyclic carbonate-based solvent may include a compound represented by the following Chemical Formula 15.

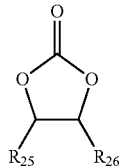

Chemical Formula 15

In Chemical Formula 15, each of $R_{25}$ and $R_{26}$ is independently selected from hydrogen, halogens, cyano groups (CN), nitro groups ($NO_2$), and C1 to C5 fluoroalkyl groups, provided that at least one of $R_{25}$ or $R_{26}$ is a C1 to C5 fluoroalkyl group.

Nonlimiting examples of suitable compounds represented by Chemical Formula 15 include difluoroethylenecarbonate and fluoropropylene carbonate.

The fluorinated cyclic carbonate-based solvent may be included in an amount of about 1 volume % to about 20 volume % based on the entire amount of the non-aqueous organic solvent. In some embodiments, for example, the fluorinated cyclic carbonate-based solvent may be included in an amount of about 5 volume % to about 10 volume %. When the fluorinated cyclic carbonate-based solvent is included in an amount within this range, it may form an optimized layer between the negative electrode and the electrolyte solution, thereby improving cycle-life and battery performance at high temperatures.

The lithium salt is dissolved in an organic solvent and supplies lithium ions in the battery, thereby enabling the basic operation of the rechargeable lithium battery and improving the transportation of lithium ions between the positive and negative electrodes. Nonlimiting examples of the lithium salt include supporting salts such as $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiCF_3SO_3$, $LiC_4F_9SO_3$, $LiC_6H_5SO_3$, LiSCN, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bisoxalato borate: LiBOB).

The lithium salt may be used in a concentration of about 0.1M to about 2.0M. When the lithium salt is included within the above concentration range, the electrolyte may have optimal conductivity and viscosity and thus enable good performance and lithium ion mobility.

According to other embodiments of the present invention, a lithium ion battery includes the electrolyte for a lithium ion battery. The lithium ion battery may have a variety of shapes and sizes, including cylindrical, prismatic, or coin-type batteries, and may also be a thin film or rather bulky type depending on its size. Structures and fabricating methods for lithium ion batteries pertaining to the present invention are well known.

FIG. 1 is a schematic cross-sectional view of a lithium ion battery according to embodiments of the present invention. The lithium ion battery is not limited to the structure depicted in FIG. 1, but rather may be fabricated into a variety of shapes and types, including, but not limited to, prismatic types, coin types, button types, laminated sheet types, flat types, cylindrical types, and the like. The battery can be suitably designed by those of skill in the art based on the desired application.

Referring to FIG. 1, the rechargeable lithium battery 1 includes a battery case 5 including a negative electrode 2, a positive electrode 3, and a separator 4 between the positive electrode 3 and the negative electrode 2. An electrolyte is impregnated in the case 5, and a sealing member 6 seals the battery case 5.

The negative and positive electrodes 2 and 3 may be fabricated by forming a negative active material slurry (including a negative active material) or a positive active material slurry (including a positive active material) on a current collector.

The negative electrode may include a current collector and a negative active material layer disposed on the current collector. The negative active material layer includes a negative active material.

The negative active material may include a material that reversibly intercalates/deintercalates lithium ions, lithium metal, a lithium metal alloy, a material capable of doping and dedoping lithium, a material capable of reacting with lithium ions to form a lithium-containing compound, or a transition metal oxide. Nonlimiting examples of the lithium metal alloy include alloys of lithium and at least one metal selected from Na, K, Rb, Cs, Fr, Be, Mg, Ca, Sr, Si, Sb, Pb, In, Zn, Ba, Ra, Ge, Al, and Sn.

Nonlimiting examples of the transition metal oxide, the material capable of doping and dedoping lithium, and the material capable of reacting with lithium ions to form a lithium-containing compound include vanadium oxide, lithium vanadium oxide, Si, $SiO_x$ (where 0<x<2), Si—Y alloys (where Y is an element selected from alkali metals, alkaline-earth metals, group 13 elements, group 14 elements, group 15 elements, group 16 elements, transition elements, rare earth elements, and combinations thereof, but Y is not Si), Sn, $SnO_2$, Sn-Q alloys (where Q is an element selected from alkali metals, alkaline-earth metals, group 13 elements, group 14 elements, group 15 elements, group 16 elements, transition elements, rare earth elements, and combinations thereof, but Q is not Sn), and mixtures thereof. In some embodiments, at least one of these materials may be mixed with $SiO_2$. The elements Y and Q may be independently selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

The material that reversibly intercalates/deintercalates lithium ions includes a carbon material. The carbon material may be any carbon-based negative active material generally used in lithium ion rechargeable batteries. Nonlimiting examples of the carbon material include crystalline carbon, amorphous carbon, and mixtures thereof. The crystalline carbon may be unshaped or sheet-, flake-, spherical-, or fiber-shaped natural graphite or artificial graphite. The amorphous carbon may be soft carbon, hard carbon, mesophase pitch carbide, fired coke, and the like.

The negative active material layer may include a binder and optionally, further includes a conductive material. The binder improves the binding of the active material particles with one another and the binding of the negative active material with the current collector. Nonlimiting examples of the binder include polyvinyl alcohol, carboxymethyl cellulose, hydroxypropyl cellulose, diacetyl cellulose, polyvinyl chloride, carboxylated polyvinyl chloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like.

The conductive material is included to attribute conductivity to the electrode. It may include any electrically conductive material, so long as it does not cause a chemical change.

Nonlimiting examples of the conductive material include carbon-based materials (such as natural graphite, artificial graphite, carbon black, acetylene black, ketjen black, carbon fibers, and the like), metal-based materials (such as metal powders, metal fibers, and the like, e.g., copper, nickel, aluminum, silver, and the like), conductive polymers (such as polyphenylene derivatives), and mixtures thereof.

The current collector may be selected from copper foils, nickel foils, stainless steel foils, titanium foils, nickel foams, copper foams, polymer substrates coated with a conductive metal, and combinations thereof.

The positive electrode includes a current collector and a positive active material layer disposed on the current collector. The positive active material includes at least one lithiated intercalation compound that reversibly intercalates and deintercalates lithium ions. The positive active material may include a composite oxide including lithium and at least one element selected from cobalt, manganese, and nickel. Nonlimiting examples of suitable lithium-containing compounds include those represented by the following formulae.

$Li_aA_{1-b}X_bD_2$ (0.90≤a≤1.8, 0≤b≤0.5), $Li_aE_{1-b}X_bO_{2-c}D_c$ (0.90≤a≤1.8, 0≤b≤0.5, 0≤c≤0.05), $Li_aE_{2-b}X_bD_4$ (0.90≤a≤1.8, 0≤b≤0.5), $Li_aE_{2-b}X_bO_{4-c}D_c$ (0.90≤a≤1.8, 0≤b≤0.5, 0≤c≤0.05), $Li_aNi_{1-b-c}Co_bX_cD_\alpha$ (0.90≤a≤1.8, 0≤b≤0.5, 0≤c≤0.05, 0<α≤2), $Li_aNi_{1-b-c}Co_bX_cO_{2-\alpha}T_\alpha$ (0.90≤a≤1.8, 0≤b≤0.5, 0≤c≤0.05, 0<α<2), $Li_aNi_{1-b-c}Co_bX_cO_{2-\alpha}T_2$ (0.90≤a≤1.8, 0≤b≤0.5, 0≤c≤0.05, 0<α<2), $Li_aNi_{1-b-c}Mn_bX_cD_\alpha$ (0.90≤a≤1.8, 0≤b≤0.5, 0≤c≤0.05, 0<α≤2), $Li_aNi_{1-b-c}Mn_bX_cO_{2-\alpha}T_\alpha$ (0.90≤a≤1.8, 0≤b≤0.5, 0≤c≤0.05, 0<α<2), $Li_aNi_{1-b-c}Mn_bX_cO_{2-\alpha}T_2$ (0.90≤a≤1.8, 0≤b≤0.5, 0≤c≤0.05, 0<α<2), $Li_aNi_bE_cG_dO_2$ (0.90≤a≤1.8, 0≤b≤0.9, 0≤c≤0.5, 0.001≤d≤0.1), $Li_aNi_bCo_cMn_dG_eO_2$ (0.90≤a≤1.8, 0≤b≤0.9, 0≤c≤0.5, 0≤d≤0.5, 0.001≤e≤0.1), $Li_aNiG_bO_2$ (0.90≤a≤1.8, 0.001≤b≤0.1), $Li_aCoG_bO_2$ (0.90≤a≤1.8, 0.001≤b≤0.1), $Li_aMnG_bO_2$ (0.90≤a≤1.8, 0.001≤b≤0.1), $Li_aMn_2G_bO_4$ (0.90≤a≤1.8, 0.001≤b≤0.1), $QO_2$, $QS_2$, $LiQS_2$, $V_2O_5$, $LiV_2O_5$, $LiIO_2$, $LiNiVO_4$, $Li_{(3-f)}J_2(PO_4)_3$ (0≤f≤2), $Li_{(3-f)}Fe_2(PO_4)_3$ (0≤f≤2), and $LiFePO_4$.

In the above formulae, A is selected from Ni, Co, Mn, and combinations thereof. X is selected from Al, Ni, Co, Mn, Cr, Fe, Mg, Sr, V, rare earth elements, and combinations thereof. D is selected from O, F, S, P, and combinations thereof. E is selected from Co, Mn, and combinations thereof. T is selected from F, S, P, and combinations thereof. G is selected from Al, Cr, Mn, Fe, Mg, La, Ce, Sr, V, and combinations thereof. Q is selected from Ti, Mo, Mn, and combinations thereof. I is selected from Cr, V, Fe, Sc, Y, and a combinations thereof. J is selected from the group consisting of V, Cr, Mn, Co, Ni, Cu, and combinations thereof.

The lithium-containing compound may have a coating layer on the surface, or may be mixed with another compound having a coating layer. The coating layer may include at least one coating element compound selected from oxides of a coating element, hydroxides of a coating element, oxyhydroxides of a coating element, oxycarbonates of a coating element, and hydroxycarbonates of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be applied by any method so long as it does not adversely influence the properties of the positive active material. For example, the method may include any coating method such as spray coating, dipping, and the like, which are well-known to those ordinarily skilled in the related field.

The positive active material layer also includes a binder and optionally further includes a conductive material. The binder improves the binding of the positive active material particles to one another and also the binding of the positive active material with the current collector. Nonlimiting examples of the binder include polyvinyl alcohol, carboxymethyl cellulose, hydroxypropyl cellulose, diacetyl cellulose, polyvinyl chloride, carboxylated polyvinyl chloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like.

The conductive material is included to attribute conductivity to the electrode. It may include any electrically conductive material, so long as it does not cause a chemical change. Nonlimiting examples of the conductive material include carbon-based materials (such as natural graphite, artificial graphite, carbon black, acetylene black, ketjen black, carbon fibers, and the like), metal-based materials (such as metal powders, metal fibers, and the like, including, e.g., copper, nickel, aluminum, silver, and the like), conductive polymers (such as polyphenylene derivatives), and mixtures thereof.

The current collector may be aluminum (Al) but is not limited thereto.

The negative electrode and positive electrode may be obtained by mixing the active material, a conductive material and a binder in a solvent to prepare an active material composition, and coating the active material composition on a current collector. The electrode-manufacturing method is well known. The solvent may include N-methylpyrrolidone or the like, but is not limited thereto.

The lithium ion battery may further include a separator between the negative electrode and the positive electrode, as needed. Nonlimiting examples of suitable separator materials include polyethylene, polypropylene, polyvinylidene fluoride, and multi-layers thereof (such as polyethylene/polypropylene double-layered separators, polyethylene/polypropylene/polyethylene triple-layered separators, and polypropylene/polyethylene/polypropylene triple-layered separators).

The following examples are presented for illustrative purposes only, and do not limit the scope of the present invention.
Preparation of an Electrolyte Example 1

A solvent was prepared by uniformly mixing 30 volume % of N-methylperfluoropropyl piperidinium bis(trifluoromethanesulfonyl)imide (MPPpTFSI) as an ionic liquid including a fluorinated cation, 10 volume % of trimethyl phosphate (TMP) as a phosphorus-based solvent, and 60 volume % of dimethyl carbonate (DMC) as a carbonate-based solvent. Then, $LiPF_6$ was dissolved in the solvent at 1.0 M concentration, thus preparing an electrolyte.

Comparative Example 1

A solvent was prepared by mixing 70 volume % of dimethyl carbonate as a linear carbonate-based solvent and 30 volume % of ethylene carbonate (EC) as a cyclic carbonate-based solvent. Then, $LiPF_6$ was dissolved in the solvent at 1.0 M concentration, thus preparing an electrolyte.

Flame Retardancy Experiment

The electrolytes according to Example 1 and Comparative Example 1 were examined for flame retardancy according to a UL94 method. The results are provided in FIGS. 2 and 3.

Figure 2:
FIG. 2 is a photograph of the results of a flame retardancy experiment conducted on a lithium ion battery prepared according to Example 1.
Figure 3:
FIG. 3 is a photograph of the results of a flame retardancy experiment conducted on a lithium ion battery prepared according to Comparative Example 1.

As shown in FIG. 2, a 4 cm×1 cm glass fiber prepared using the electrolyte according to Example 1 had no flame at all. In contrast, FIG. 3 shows that a 4 cm×1 cm glass fiber prepared using the electrolyte solution according to Comparative Example 1 was easily flamed.

Fabrication of Lithium Ion Battery Cell

An artificial graphite negative active material was mixed with a polyvinylidene fluoride (PVdF) binder in a weight ratio of about 94:6 in N-methylpyrrolidone (NMP), thus preparing a negative active material slurry. The negative active material slurry was coated on a copper foil current collector. The coated current collector was dried and compressed, thus fabricating a negative electrode.

A $LiCoO_2$ positive active material, a polyvinylidene fluoride binder, and a carbon black (super-P) conductive material were mixed in a weight ratio of 96:2:2 in N-methylpyrrolidone to prepare a positive active material slurry. This positive active material slurry was coated on an aluminum foil current collector. The coated current collector was dried and compressed, thus fabricating a positive electrode.

The negative and positive electrodes were spiral-wound with a polyethylene separator and compressed. The resulting assembly was put in a coin-type battery cell (2032 cell; a coin full cell) case. Each electrolyte according to Example 1 and Comparative Example 1 was injected into a case, thereby fabricating a lithium ion battery cell with an electrolyte according to Example 1 and a lithium ion battery cell with an electrolyte according to Comparative Example 1.

Thermal Stability Evaluation: Experiment of Being Allowed to stand at High Temperature The lithium ion battery cells according to Example 1 and Comparative Example 1 were tested by being allowed to stand at a high temperature. The results are provided in Table 1 below. The test was performed by allowing the lithium ion battery cells according to Example 1 and Comparative Example 1 to stand at 60° C. for 7 days in a state of full-charge at 1C.

As reported herein, the retention value is the ratio of the capacity of the cell after being allowed to stand for 7 days to the capacity before being allowed to stand (reported as a percentage). The recovery value is the ratio of the initial charge of the cell to the charge after being recharged (reported as a percentage).

TABLE 1

|  | Example 1 | Comparative Example 1 |
| --- | --- | --- |
| Retention (%) | 90 | 85 |
| Recovery (%) | 92 | 87 |
| ΔOCV | 4.1 | 4.07 |

Referring to Table 1, the lithium ion battery cell including the electrolyte solution according to Example 1 had improved retention, recovery, and ΔOCV compared with the lithium ion battery cell including the electrolyte solution according to Comparative Example 1.

While this disclosure has been described in connection with certain exemplary embodiments, those of ordinary skill in the art understand that various modifications and changes to the described embodiments may be made without departing from the spirit and scope of the present invention, as described in the appended claims.

What is claimed is:
1. An electrolyte for a lithium ion battery comprising:
a lithium salt; and
a non-aqueous organic solvent comprising:
    a linear carbonate-based solvent; and
    a flame-retardant solvent comprising an ionic liquid comprising:
        a phosphate-based solvent;
        an anion selected from the group consisting of anions represented by Chemical Formulae 9 to 14, and combinations thereof:

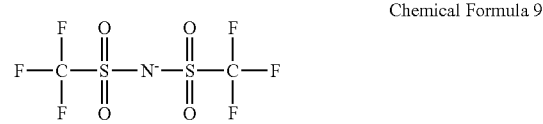

Chemical Formula 9

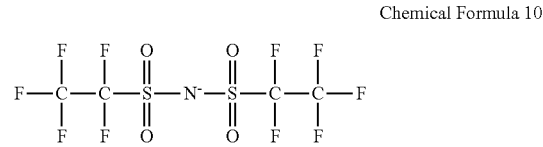

Chemical Formula 10

Chemical Formula 11

Chemical Formula 12

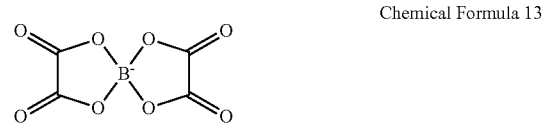

Chemical Formula 13

-continued

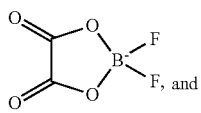
Chemical Formula 14 a fluorinated cation comprising a cation selected from the group consisting of cations represented by Chemical Formulae 2, 4, 6 and 8, and combinations thereof,

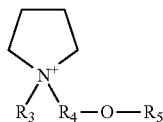
Chemical Formula 2 wherein each of $R_3$ and $R_5$ is independently selected from the group consisting of fluorine-substituted C1 to C5 alkyl groups and unsubstituted C1 to C5 alkyl groups, $R_4$ is a fluorine-substituted C1 to C5 alkylene group or an unsubstituted C1 to C5 alkylene group, and at least one of $R_4$ or $R_5$ is a group in which at least one hydrogen is substituted with fluorine,

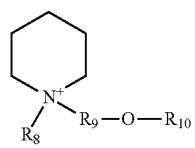
Chemical Formula 4 wherein each of $R_8$ and $R_{10}$ is independently selected from the group consisting of fluorine-substituted C1 to C5 alkyl groups and unsubstituted C1 to C5 alkyl groups, $R_9$ is a fluorine-substituted C1 to C5 alkylene group or an unsubstituted C1 to C5 alkylene group, and at least one of $R_9$ or $R_{10}$ is a group in which at least one hydrogen is substituted with fluorine,

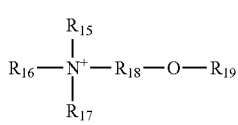
Chemical Formula 6 wherein each of $R_{15}$ to $R_{17}$ and $R_{19}$ is independently selected from the group consisting of fluorine-substituted C1 to C5 alkyl groups and unsubstituted C1 to C5 alkyl groups, $R_{18}$ is a fluorine-substituted C1 to C5 alkylene group or an unsubstituted C1 to C5 alkylene group, and at least one of $R_{18}$ or $R_{19}$ is a group in which at least one hydrogen is substituted with fluorine,

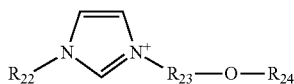
Chemical Formula 8 wherein each of $R_{22}$ and $R_{24}$ is independently selected from the group consisting of fluorine-substituted C1 to C5 alkyl groups and unsubstituted C1 to C5 alkyl groups, $R_{23}$ is a fluorine-substituted C1 to C5 alkylene group or an unsubstituted C1 to C5 alkylene group, and at least one of $R_{22}$ or $R_{24}$ is a group in which at least one hydrogen is substituted with fluorine.

2. The electrolyte for a lithium ion battery of claim 1, wherein the phosphate-based compound comprises a compound selected from the group consisting of trimethyl phosphate (TMP), triethyl phosphate (TEP), tripropylphosphate (TPP), tricresyl phosphate (TCP), trixylenyl phosphate (TXP), and combinations thereof.

3. The electrolyte for a lithium ion battery of claim 1, wherein the linear carbonate-based solvent comprises a solvent selected from the group consisting of dimethyl carbonate (DMC), diethyl carbonate (DEC), dipropyl carbonate (DPC), methylethyl carbonate (MEC), methylpropyl carbonate (MPC), ethylpropyl carbonate (EPC), and combinations thereof.

4. The electrolyte for a lithium ion battery of claim 1, wherein the non-aqueous organic solvent comprises:
    about 20 volume % to about 50 volume % of the flame-retardant solvent; and
    about 50 volume % to about 80 volume % of the linear carbonate-based solvent.

5. The electrolyte for a lithium ion battery of claim 1, wherein the non-aqueous organic solvent comprises
    about 20 volume % to about 50 volume % of the flame-retardant solvent;
    about 60 volume % to about 75 volume % of the linear carbonate-based solvent; and
    further comprising about 5 volume % to about 10 volume % of a fluorinated cyclic carbonate-based solvent.

6. A lithium ion battery comprising:
    an electrolyte comprising:
        a lithium salt, and
        a non-aqueous organic solvent comprising:
            a linear carbonate-based solvent; and
            a flame-retardant solvent comprising an ionic liquid comprising:
                a phosphate-based solvent,
                an anion selected from the group consisting of anions represented by Chemical Formulae 9 to 14, and combinations thereof:

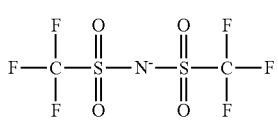
Chemical Formula 9

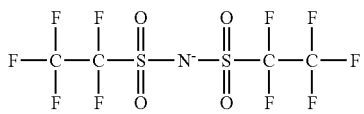
Chemical Formula 10

-continued

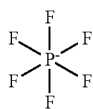

Chemical Formula 11

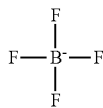

Chemical Formula 12

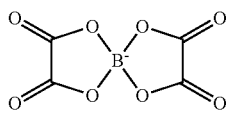

Chemical Formula 13

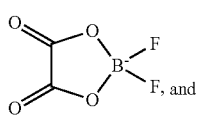

Chemical Formula 14 a fluorinated cation comprising a cation selected from the group consisting of cations represented by Chemical Formulae 2 to 8, 2, 4, 6 and 8, and combinations thereof:

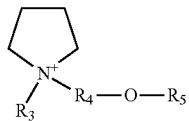

Chemical Formula 2 wherein each of $R_3$ and $R_5$ is independently selected from the group consisting of fluorine-substituted C1 to C5 alkyl groups and unsubstituted C1 to C5 alkyl groups, $R_4$ is a fluorine-substituted C1 to C5 alkylene group or an unsubstituted C1 to C5 alkylene group, and at least one of $R_4$ or $R_5$ is a group in which at least one hydrogen is substituted with fluorine,

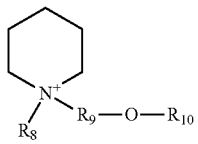

Chemical Formula 4 wherein each of $R_8$ and $R_{10}$ is independently selected from the group consisting of fluorine-substituted C1 to C5 alkyl groups and unsubstituted C1 to C5 alkyl groups, $R_9$ is a fluorine-substituted C1 to C5 alkylene group or an unsubstituted C1 to C5 alkylene group, and at least one of $R_9$ or $R_{10}$ is a group in which at least one hydrogen is substituted with fluorine,

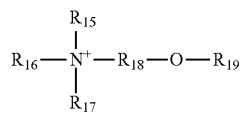

Chemical Formula 6 wherein each of $R_{15}$ to $R_{17}$ and $R_{19}$ is independently selected from the group consisting of fluorine-substituted C1 to C5 alkyl groups and unsubstituted C1 to C5 alkyl groups, $R_{18}$ is a fluorine-substituted C1 to C5 alkylene group or an unsubstituted C1 to C5 alkylene group, and at least one of $R_{13}$ or $R_{19}$ is independently a group in which at least one hydrogen is substituted with fluorine, and

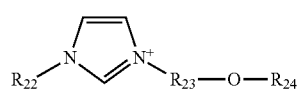

Chemical Formula 8 wherein each of $R_{22}$ and $R_{24}$ is independently selected from the group consisting of fluorine-substituted C1 to C5 alkyl groups and unsubstituted C1 to C5 alkyl groups, $R_{23}$ is a fluorine-substituted C1 to C5 alkylene group or an unsubstituted C1 to C5 alkylene group, and at least one of $R_{22}$ or $R_{24}$ is a group in which at least one hydrogen is substituted with fluorine;

a positive electrode comprising a positive active material that reversibly intercalates/deintercalates lithium ions; and a negative electrode comprising a negative active material that reversibly intercalates/deintercalates lithium ions.

7. The lithium ion battery of claim 6, wherein the phosphate-based compound comprises a compound selected from the group consisting of trimethyl phosphate (TMP), triethyl phosphate (TEP), tripropylphosphate (TPP), tricresyl phosphate (TCP), trixylenyl phosphate (TXP), and combinations thereof.

8. The lithium ion battery of claim 6, wherein the non-aqueous organic solvent comprises:
about 20 volume % to about 50 volume % of the flame-retardant solvent; and
about 50 volume % to about 80 volume % of the linear carbonate-based solvent.

* * * * *